United States Patent [19]
Kupke

[11] Patent Number: 5,234,600
[45] Date of Patent: Aug. 10, 1993

[54] APPARATUS AND METHOD FOR AUTOMATICALLY CONTROLLING THE PERMEABILITY OF A TRAVELING BRIDGE FILTER SYSTEM

[75] Inventor: John A. Kupke, Annapolis, Md.

[73] Assignee: Agency Environmental, Inc., Hanover, Md.

[21] Appl. No.: 872,236

[22] Filed: Apr. 22, 1992

[51] Int. Cl.$^5$ .............................................. B01D 21/34
[52] U.S. Cl. ...................... 210/662; 210/86; 210/94; 210/143; 210/275; 210/744; 210/745; 210/793
[58] Field of Search ............ 210/86, 93, 94, 96.1, 210/104, 108, 143, 264, 275, 277, 662, 670, 676, 677, 678, 744, 745, 793, 794, 795

[56] References Cited

U.S. PATENT DOCUMENTS

| | | | |
|---|---|---|---|
| 3,239,061 | 3/1966 | Horning et al. | 210/793 |
| 3,817,378 | 6/1974 | Ross | 210/108 |
| 4,152,265 | 5/1979 | Meyers | 210/273 |
| 4,411,779 | 10/1983 | McConnell | 210/108 |
| 4,454,034 | 6/1984 | Astrom et al. | 210/275 |
| 4,540,487 | 9/1985 | Johnson et al. | 210/264 |
| 4,818,414 | 4/1989 | Ross | 210/275 |
| 4,885,083 | 12/1989 | Banks | 210/108 |
| 5,089,117 | 2/1992 | Nichols | 210/275 |

OTHER PUBLICATIONS

Agency Environmental, Inc. *Clean Water For Less* TM 4 pages, Copyright 1991, Hanover, Maryland.

Primary Examiner—Joseph W. Drodge
Attorney, Agent, or Firm—Joseph W. King, Jr.; Gay Ann Spahn

[57] ABSTRACT

The present invention comprises apparatus and a method of automatically controlling the permeability of filter beds. In particular, this invention directs itself to filter beds or tanks that are divided into a plurality of contiguous compartments or cells, each compartment containing a filtering media substrate, which substrate is cleansed or backwashed, periodically, when necessary, by a traveling bridge backwash mechanism. The duration and frequency of backwashing is automatically controlled to maintain a desired overall permeability and throughput performance of the filter bed. Permeability control is dynamic to maintain optimum performance under all conditions, i.e. changing in response to fluctuating filter bed hydraulic or solids loading rates.

18 Claims, 6 Drawing Sheets

APPARATUS AND METHOD FOR AUTOMATICALLY CONTROLLING THE PERMEABILITY OF A TRAVELING BRIDGE FILTER SYSTEM

BACKGROUND OF THE INVENTION

1. Field of the Invention

The present invention concerns improvements in traveling bridge filtering systems. More particularly, it concerns methods and improved apparatus for automatically controlling the backwash cycle and permeability of the filter bed in such systems.

2. Description of Related Art

The traveling bridge filter system has proven to be quite efficient, cost effective and durable in certain applications. The art is exemplified in U.S. Pat. Nos. 3,239,061 and 4,152,265 and further exemplified in assignee's brochure, *Clean Water for Less*, Copyright 1991.

A principal use of a traveling bridge filter system is the removal of suspended material or solids from a liquid influent in order to meet governmental regulatory requirements. In recent Years, regulatory requirements have become more stringent, making filtering system efficiency and reliability a paramount concern.

Presently, filters of this type initiate a backwash whenever the influent level in the filter bed reaches a predetermined and fixed elevation. During the backwash cycle, a traveling bridge backwash mechanism is commenced to move, cell by cell, from one end of the filter bed to the opposite end. Once the backwash mechanism reaches the opposite end of the bed, if the water level in the bed has fallen below a given elevation, also predetermined and fixed, the backwash cycle terminates. If the water level in the filter bed has not fallen below the predetermined fixed elevation, the backwash mechanism will continue to operate, traveling cell by cell from one end of the filter bed to the other, until an operator intervenes, or until, when the backwash mechanism is at one end of the bed, the water level has fallen below the predetermined elevation. This is a very limited method of backwash control.

It is known that in traveling bridge filter systems fluctuating flow rates and solids loading are a commonplace occurrence. Higher hydraulic loading alone typically results in higher water levels in the filter bed even when the filtration media is clean. With their limited method of backwash control, current filters are unable to distinguish between conditions that develop as a result of solids versus hydraulic loading. Thus, current filters initiate a backwash cycle even when insufficient solids have been deposited to warrant media cleansing. This is an undesirable and limited method of backwash control that adversely effects the efficiency, cost-effectiveness, permeability and throughput performance of the filter bed system.

It is widely known by those familiar with the art that over time a mat of solids develops on the surface of the filter media schmutzdecke resulting in beneficial and substantial solids removal as well as detrimental and substantial headloss. As the quantity of material forming the mat increases, the permeability of the filter bed decreases. Removal of the entire mat by backwashing, however, is not desired since within limits, the solids removal efficiency and effluent or filtrate quality are directly related to the quantity of material forming the mat.

Current methods of backwashing filter beds result in excessive and unnecessary backwash usage and impair filter performance by removing excessive solids thereby damaging the mat of solids which is so influential in optimizing filter performance.

A principal object of the present invention is the improvement of traveling bridge filter systems vis-a-vis new apparatus and methods for automatically controlling the backwash cycle and the permeability of the filter bed by evaluating dynamic hydraulic and solids loading conditions, initiating and controlling the backwash cycle and executing automatic adjustments to maintain the highest filtering efficiency possible, without operator intervention.

A further object is the automatic optimization of filter throughput.

The detailed description discloses the preferred embodiments of the invention however, various changes and modifications to the preferred embodiments are within the spirit and scope of the invention.

SUMMARY OF THE INVENTION

The apparatus and method of the invention include improvements to traveling bridge filter systems such that the filter bed for such a system is cleansed automatically by way of a backwash cycle only when the filter contains sufficient solids to warrant cleansing.

The objects of the invention are accomplished by various embodiments of the invention including the addition of structures which automatically (a) calculate the filter bed headloss under changing hydraulic and solids loading conditions, (b) calculate the filter permeability under such changing conditions, (c) control the initiation and operation of a backwash cycle, and (d) modify and/or correct permeability initialization values based on changing filter bed applications and/or operational conditions.

The objects are also accomplished by embodiments of the invention which utilize steps including (a) loading permeability initialization values into the backwash controller, (b) monitoring fluid levels in the filter, (c) determining the initialization, duration and frequency of the backwash cycle, and (d) determining whether modifications and/or corrections should be made to the permeability initialization values based on the filter bed application and the changing hydraulic and solids loading conditions.

The invention provides an artificial intelligence feature that allows the filter to adapt and change to dynamic hydraulic and solids loading conditions, without operator intervention. The invention also provides the ability to display current filter system operating conditions.

DESCRIPTION OF THE PREFERRED EMBODIMENTS

Figure 1:
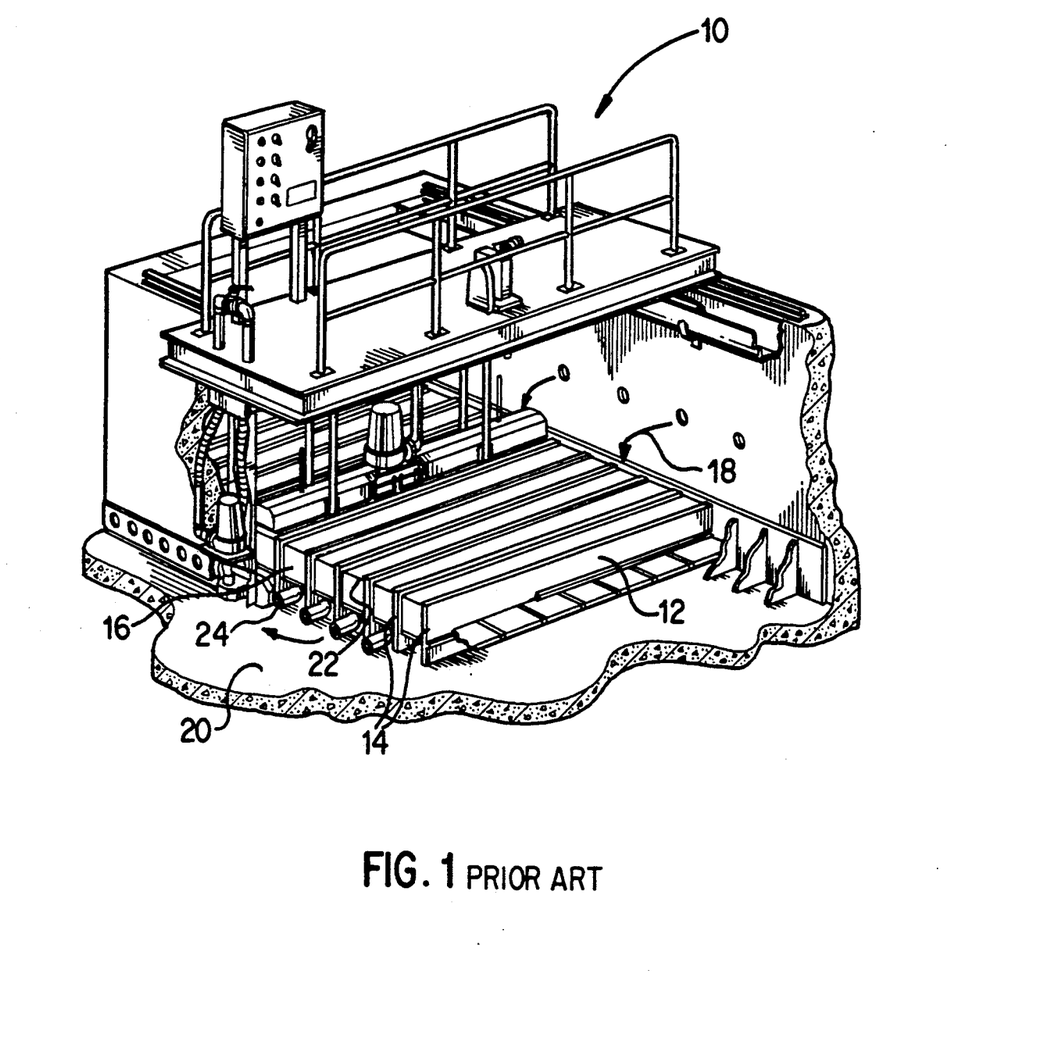
FIG. 1 is a perspective view illustrating an example of a prior art filter to which the present invention is an improvement.

The present invention relates to improvements in traveling bridge filter bed systems. Such systems include rectangular or circular filter beds. A typical rectangular traveling bridge filter bed is depicted in FIG. 1, wherein the filter bed (10) is comprised of a plurality of compartments or cells (12) defined by partitions (14). In the system depicted, each filter contains porous filter media (16), such as sand, through which the influent (18) flows to a filtrate or effluent compartment (20). Systems of this type currently perform both a filtering operation and a periodic backwash operation of individual cells during the filtering operation of the remaining cells.

Figure 2:
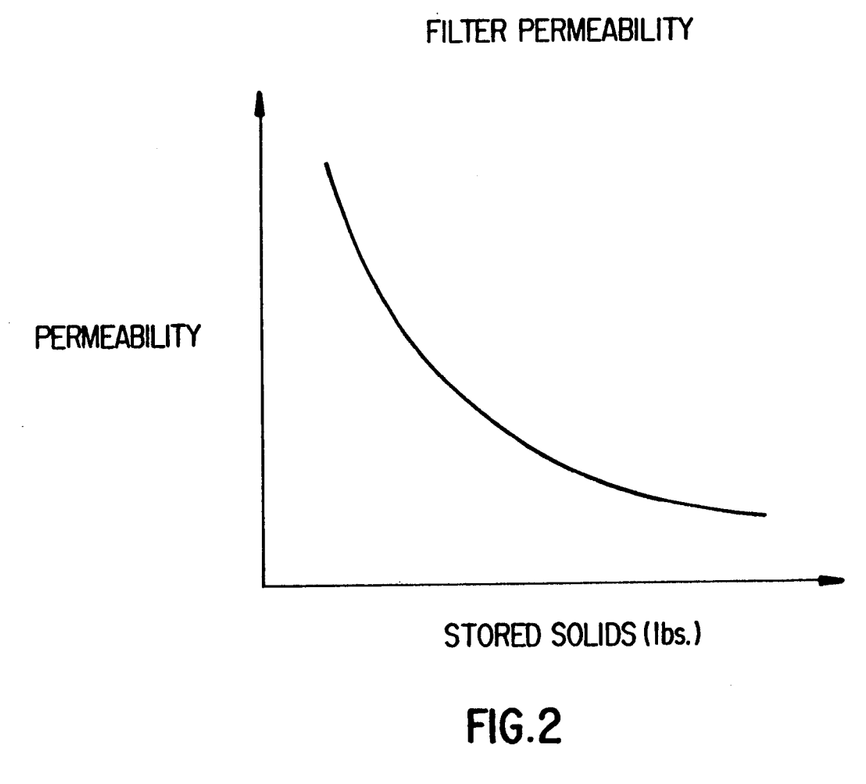
FIG. 2 is a graph illustrating the relationship between filter bed permeability and the quantity of solids stored within the filter, i.e., solids loading.

During filtering operation, solids (22) are deposited on and within the surface of the filter media (16). By reference to FIG. 2, it is seen that as the quantity of solids (22) stored within the filter increases filter permeability decreases. This will cause an increase in filter headloss, as well. By maintaining a dense mat of solids (22) on the filter surface, however, good filtrate quality can be achieved. This will result in higher headloss than would be experienced with a mat containing a lesser amount of solids.

In general, it is desirable to operate a filter at the lowest possible headloss condition consistent with the filter application and performance requirements. Thus, two identical filters may exhibit different operating characteristics depending on their particular application.

Figure 3:
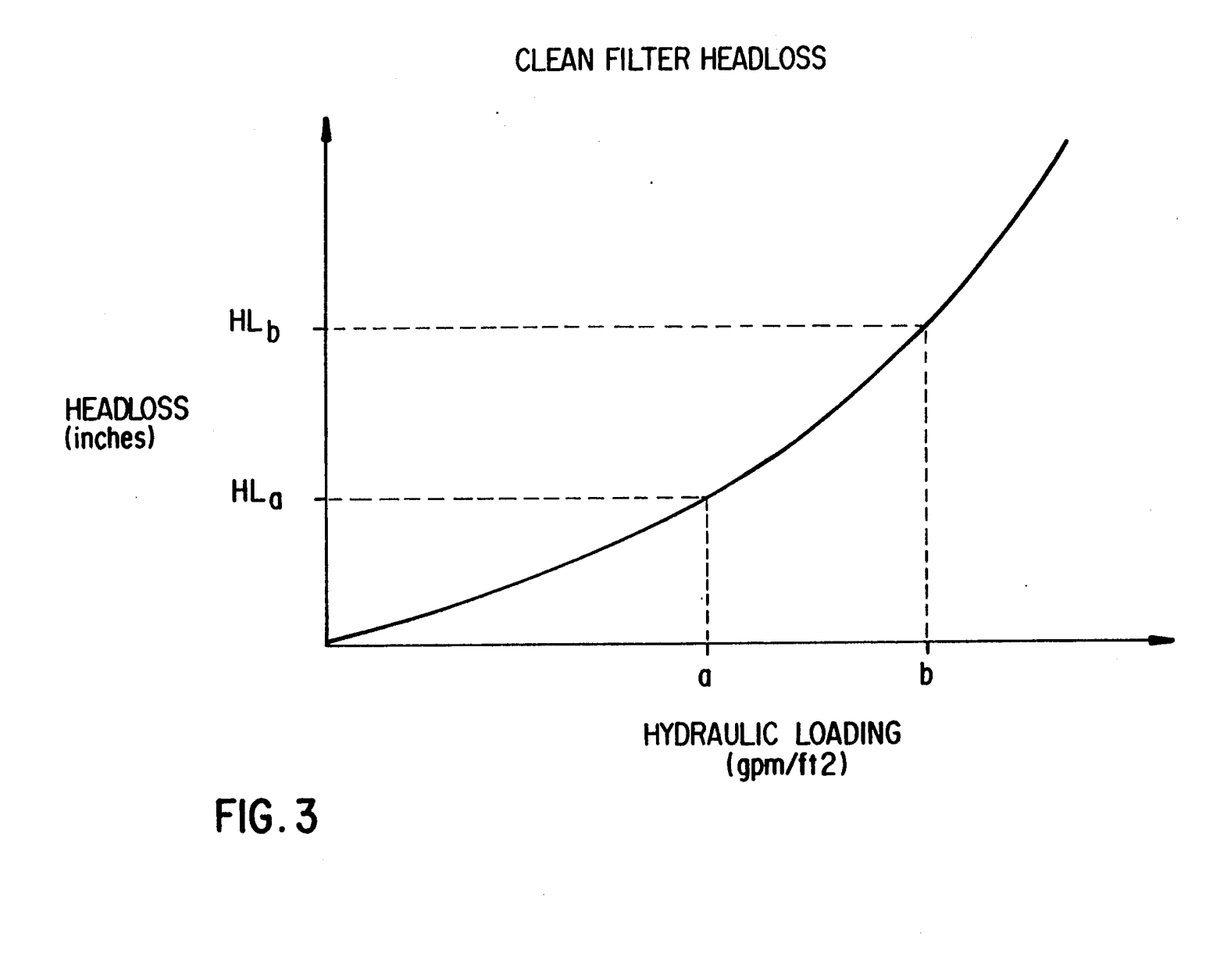
FIG. 3 is a graph illustrating the relationship between filter bed hydraulic loading and headloss.

FIG. 3 illustrates that hydraulic loading also influences headloss. As the flow rate of influent (18) into the filter (10) (typically expressed as gallons per minute per square foot o filter area) increases, filter headloss increases. This is true even when the filter bed (10) is clean.

The present invention utilizes these relationships between solids loading and permeability, and hydraulic loading and headloss and causes backwashing to be initiated only when the overall filter permeability required for the desired effluent quality decreases below a predetermined value. The present invention thus solves the problem of unnecessary and excessive backwashing since initiation of backwash may occur at various influent levels in the filter bed (10), depending on the filter throughput parameters established for the particular application of each individual filter, but only when the filter media (16) contains sufficient solids (22) to warrant cleansing.

In order to evaluate the need to backwash, in the preferred embodiment of the present invention it is necessary to first obtain a measurement of the hydraulic flow passing through the filter (10) and convert this to a hydraulic loading value by factoring in the size of the filter bed (10) in square feet. This is accomplished by sampling the head level of the effluent (24) over the filter weir every 10 milliseconds. This gives a good approximation of the influent flow rate. Based on the known area of the filter bed in feet squared, the hydraulic loading for the particular filter is determined. Headloss is influenced by the filter media type used, the particle size of suspended solids, water temperature and other factors.

The actual headloss through the filter bed (10) is then determined by subtracting the height of the effluent (24) in the filtrate compartment (20) from the height of influent level in the filter bed (10). Only then may a comparison be made between the calculated headloss and the desired or expected headloss value for an individual filter in its particular application.

Figure 4:
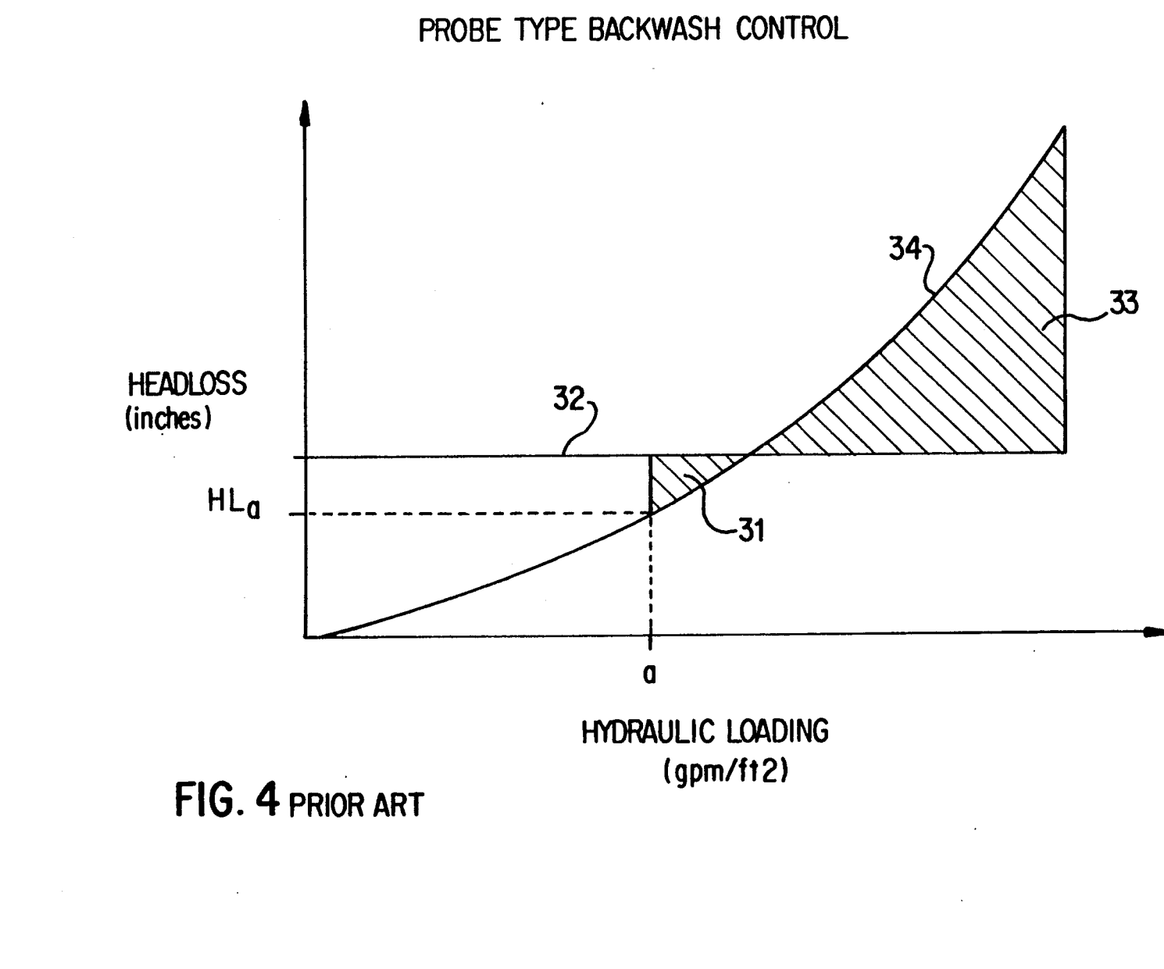
FIG. 4 depicts backwash control by the prior art.

The prior art uses a probe type backwash control method illustrated in FIG. 4. Points along the clean filter curve (34) illustrate filter headloss for changing values of hydraulic loading in the filter. Backwash is initiated at all points along the backwash initiate line (32). Wasted backwash flow is depicted as the large shaded area (33) of FIG. 4 under the clean filter curve (34) but above the backwash initiate line (32). Thus, in the prior art, backwash is initiated at a predetermined and fixed value for filter headloss illustrated in FIG. 4 by the small shaded area (31) under the backwash initiate line (32) but above the clean filter curve (34). Fixed backwash initiation allows the filter (10) to be in filtering operation, without backwash operation, only in the narrow hydraulic range (31), which limits filter efficiency and optimization.

Figure 5:
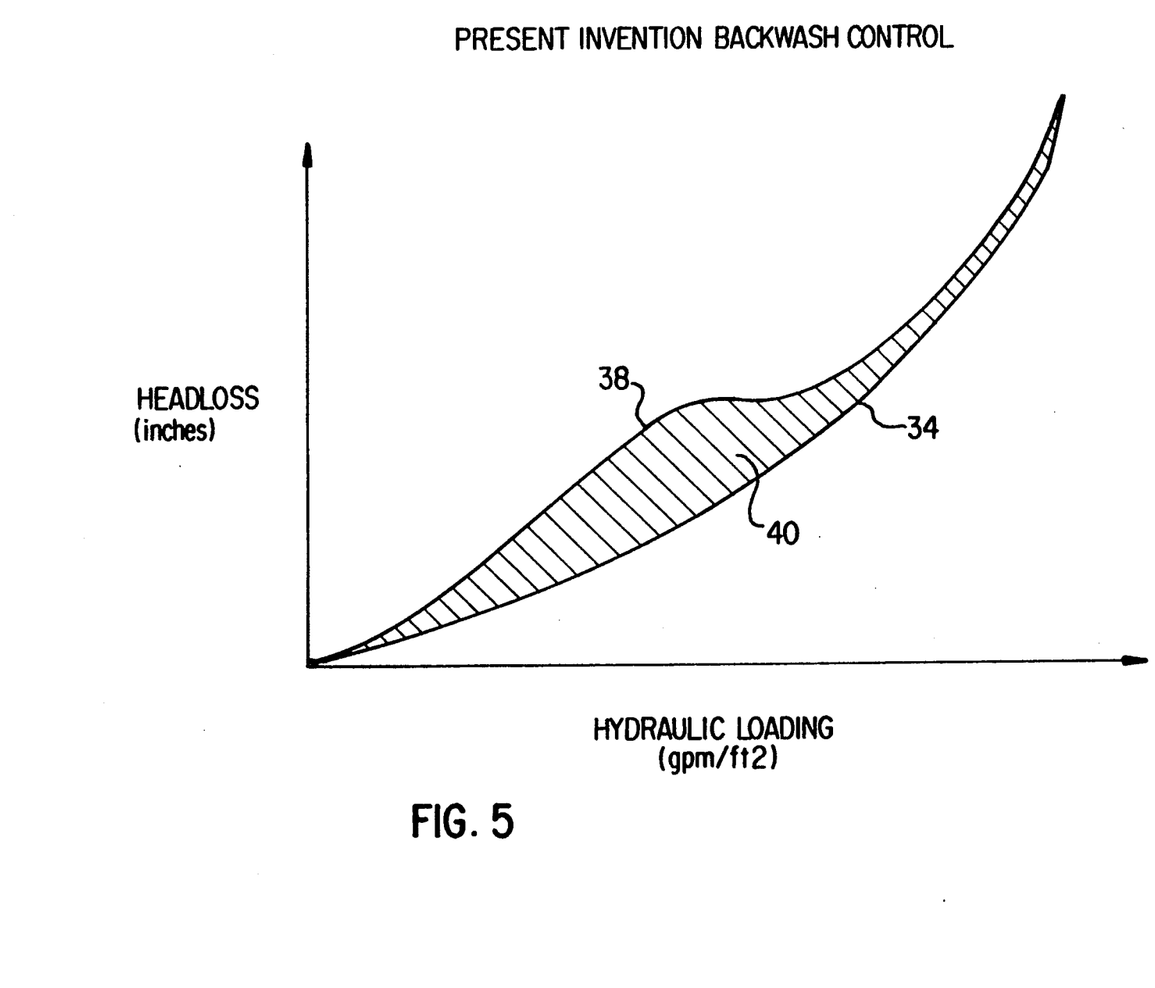
FIG. 5 depicts backwash control in the present invention.

As illustrated in FIG. 5, the present invention initiates a backwash cycle at points along the dynamic backwash initiate curve (38). Dynamic backwash initiation (38) allows the filter (10) to be performing a filtering operation, without a backwash operation, for a full range of hydraulic loading, as shown by the shaded area (40) in FIG. 5. The present invention modifies the dynamic backwash initiate curve (38) for each individual filter application. This solves the problem of excessive and unnecessary backwashing that exists in the prior art, wherein backwash initiation is predetermined and fixed (32).

Figure 6:
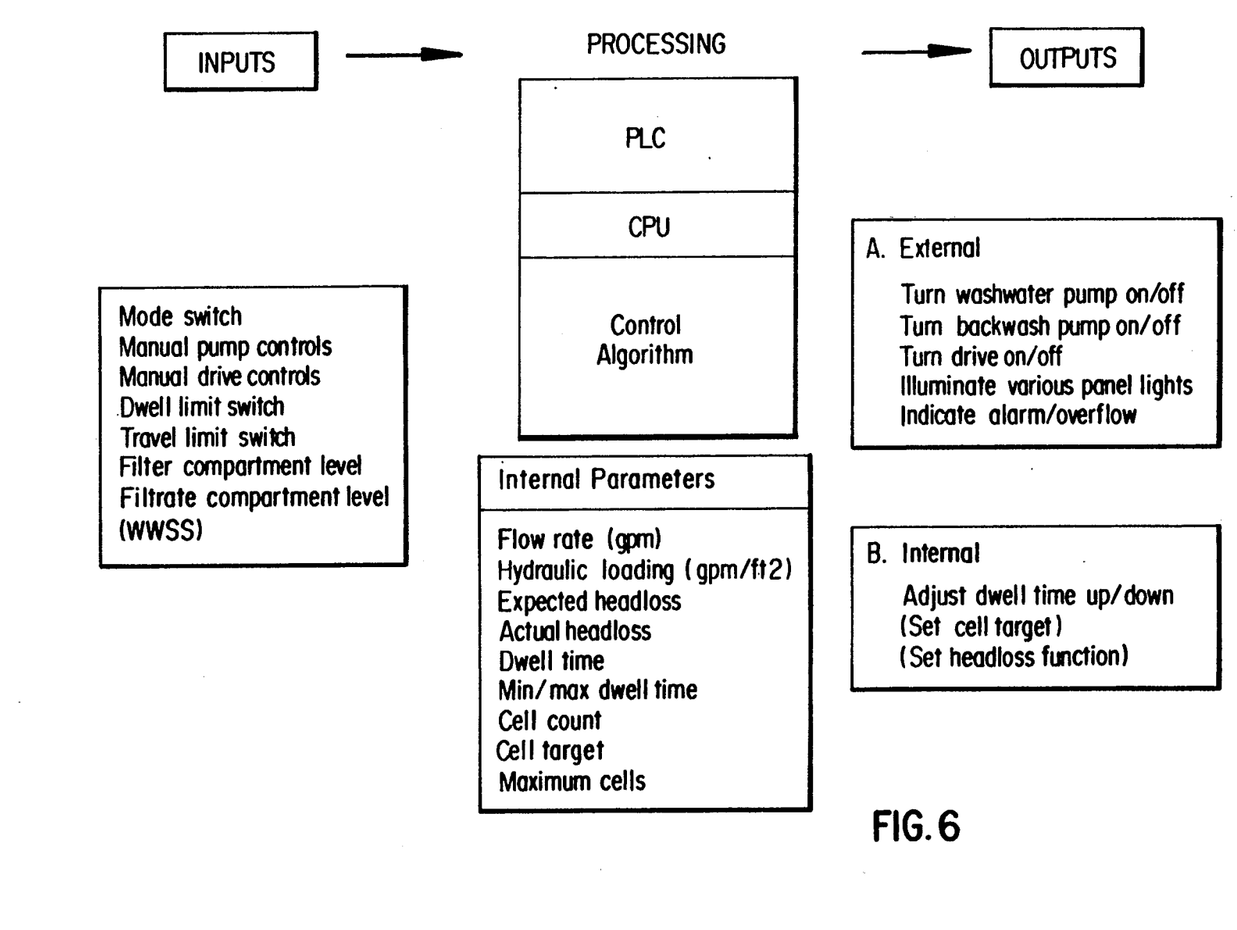
FIG. 6 illustrates the inputs, internal parameters and outputs used by the PLC to control backwash operation.

FIG. 6 schematically illustrates the input values received by the programmable logic controller or PLC, the PLC internal parameters used to determine initiation and control of the backwash operation and the PLC output values which control the backwash operation. Input values and internal parameters of the PLC can be input as initialization values by the operator manually, or electronically.

The preferred method of determining headloss is by utilizing at least one ultrasonic level detector in the filter bed (10) and filtrate compartment, respectively, to provide a continuous 4-20 milliamp analog output signal that is proportional to and thereby indicating the influent level in the filter bed and filtrate compartment, respectively. Ultrasonic detectors utilizing digital outputs may also be used. Ultrasonic level detectors are desirable because they do not require physical contact with the fluid being measured and thus, are unaffected by pH, corrosivity, temperature or other attributes of the influent being filtered. Other means for determining headloss, such as pressure head measurement, differential pressure measurement, or use of various types of mechanical floats may be utilized, but are problematic and not desired since they require physical contact with the fluid being measured.

In the preferred embodiment of the present invention, the decision to initiate a backwash cycle in order to control filter bed permeability is made by a programmable logic controller (PLC) contained within a control panel of the filter system. An example of such a programmable controller is Model No. 311 manufactured by General Electric Corporation or any other General Electric Series 90-30 PLC. Other comparable programmable controllers or other electronic computing systems could also be used.

In the preferred embodiment, the PLC uses outputs received from the ultrasonic filter bed and filtrate compartment fluid level sensors and a central processing unit (CPU) of the PLC with a control algorithm utilizing a mathematical function that determines the anticipated headloss under expected operating conditions, initiates the backwash cycle only when the headloss exceeds the value anticipated for the hydraulic and/or solids loading conditions present at that time. Solids loading is determined in the present invention inferentially.

Only when solids loading causes the anticipated or expected headloss value to be exceeded, thereby indicating that suspended solids are decreasing permeability by restricting filter flow, will the PLC activate the backwash cycle. Once the PLC determines that a backwash cycle is to begin, it will cause the washwater and backwash pumps to be turned on, and the backwash mechanism drive unit to be activated allowing the backwash mechanism to approach the first cell to be cleansed.

When the dwell limit switch attached to the traveling bridge mechanism encounters a positioning peg located over a particular cell, the PLC will cause the bridge drive unit to cease operation. The backwash mechanism, attached to the traveling bridge and suspended therefrom will remain stationary over and hydraulically sealed with the cell being cleaned for a predetermined period of time, i.e. dwell time, which is related to the desired bed permeability. During this operation, the washwater and backwash pumps remain operating.

The dwell time is initially set based on the goal of effecting a restoration of headloss (i.e. reduced water level in the filter compartment) after backwashing only a minimum number of cells in the bed. This minimum number of cells is the cell target for the controller. Backwashing, in this manner, for example, will achieve backwashing of only 20 to 30 percent of the cells leaving 70 to 80 percent of the filter bed with an undisturbed mat of solids. This will maintain filter permeability and high levels of effluent quality and filter efficacy.

If during backwashing operation on any individual cell the dwell time has elapsed, the PLC will once again calculate the headloss and determine whether the backwash cycle will continue to the next cell or whether the backwash cycle should terminate. If headloss has not been reduced to the desired clean bed level, the controller will activate the bridge drive to cause the backwash mechanism to position itself stationary over the next cell to be cleansed and repeat the backwash process.

If, after cleansing the desired number of cells (cell target) the headloss has not been restored, the PLC will increase the dwell time value for cleansing each cell, thereby attempting to minimize the number of cells above the cell target that must be cleansed in a backwash cycle to achieve the desired permeability of the filter bed.

If headloss is restored after cleansing less than the cell target, the PLC will decrease the dwell time for cleansing each cell so that during the next subsequent backwash cycle the actual number of cells cleansed should increase to approach the cell target. The cell target value is set to achieve the goal of maintaining a percentage of the filter bed in a ripened state. The degree of ripening effects both filtrate quality and the headloss. The percentage of the ripened bed to be maintained depends on specific filtrate quality objectives that are established for each individual application.

When headloss is restored to the desired and expected level, the PLC will cause the backwash cycle to terminate by suspending operation of the pumps and drive unit on the bridge. The backwash mechanism will remain stationary in position over, but not sealed with, the last cell that was backwashed, until a next subsequent backwash is initiated The electronic output from at least one turbidimeter, immersed in the backwash flow from the cell being backwashed, is monitored by the PLC. If during the backwash cycle, the dwell time on a cell is exceeded, or if all the cells in the filter bed are backwashed (indicating the cell target was exceeded) then the controller will cause the backwash cycle to operate such that cells will be backwashed, one by one, until the turbidimeter output reaches a value indicating the cell is olean. Dwell time is not a controlling consideration during this modified backwash operation.

The amount of solids, i.e., wash water suspended solids or WWSS (See FIG. 6), contained in the backwash waste water for a cell provides a signal to the PLC, allowing the PLC to calculate the precise amount of solids to be removed individually from each cell for each filter bed application. In the event solids loading is determined to be in excess of the filter bed design values, headloss might not be restored even after all cells within the filter bed have been backwashed. In this case, the PLC will modify the backwash operation and cause the backwash mechanism to dwell on an individual cell for whatever length of time is necessary to remove substantially all of the suspended solids from the filter media of that cell. The backwash mechanism will proceed in this manner, cell by cell, until headloss and permeability is restored to the desired level, at which time the PLC will terminate backwash operation by deactivating the bridge drive and the pumps.

In an alternative embodiment of the present invention, the cell target is decreased if the permeability of the filter reaches the desired value prior to reaching the cell target during backwash operation. Likewise, the cell target is increased if the permeability of the filter fails to decrease to the desired value by the time the cell target is reached during backwash operation.

The invention also provides the ability to display current filter system operating conditions by an electronic display panel, or otherwise.

What is claimed is:

1. In a traveling bridge filter system, including a traveling bridge backwash mechanism, a filter bed with a range of permeability divided into a plurality of cells wherein each cell contains filter media which is cleansed periodically by the backwash mechanism, an effluent or filtrate compartment and fluid level detecting means, the improvement comprising:

means for automatically controlling said permeability of said filter bed;

means for inputting permeability initialization values to said means for automatically controlling said filter bed permeability; and means for inputting values from each of at least one fluid level detecting means in said filter bed and at least one fluid level detecting means in said effluent or filtrate compartment, respectively, to said means for automatically controlling said filter bed permeability.

2. The filter system as in claim 1, wherein said means for automatically controlling said permeability of said filter bed comprises a programmable electronic controller.

3. The filter system as in claim 2, further comprising means for displaying current filter system operating conditions.

4. The filter system as in claim 3, wherein said displaying means comprises a control panel with at least one LED readout display.

5. The filter system as in claim 4, wherein said control panel comprises at least one push-button switch for inputting information.

6. The filter system as in claim 3, wherein said displaying means comprises at least one LCD display.

7. The filter system as in claim 3, wherein said means for inputting filter bed permeability initialization values comprises an electronic panel.

8. The filter system as in claim 1, wherein said means for automatically controlling said permeability of said filter bed comprises a programmable logic controller.

9. The filter system as in claim 8, wherein said means for inputting values from each of said at least one fluid level detecting means in said filter bed and said at least one fluid level detecting means in said effluent or filtrate compartment, respectively, comprises individual and discrete electronic connections between each of said at least one fluid level detecting means in said filter bed and in said effluent or filtrate compartment, respectively, and said programmable logic controller.

10. The filter system as in claim 8, where said at least one fluid level detecting means in said filter bed comprises at least one ultrasonic fluid level detector.

11. The filter system as in claim 10 where said at least one fluid level detecting means in said effluent or filtrate compartment comprises at least one ultrasonic level detector.

12. The filter system as in claim 10, further comprising a means for monitoring waste water turbidity.

13. The filter system as in claim 12, wherein said means for monitoring waste water turbidity comprises at least one optical turbidimeter.

14. The filter system as in claim 8, wherein said means for automatically controlling said permeability of said filter bed comprises said programmable logic controller that calculates filter headloss and permeability by comparing values from each of said at least one fluid level detecting means in said filter bed and in said effluent or filtrate compartment, respectively, and anticipated values for solids loading and hydraulic loading to automatically control a backwash operation for said filter bed.

15. A method of automatically controlling the permeability of a filter bed comprising the method steps of:

inputting permeability initialization values into a programmable logic controller;

monitoring values from at least one turbidimeter and from each of at least one fluid level detecting means in said filter bed and at least one fluid level detecting means in an effluent or filtrate compartment, respectively;

automatically initiating a backwash cycle in order to control said permeability of said filter bed in response to comparing said monitored values from said at least one turbidimeter and from each of said at least one fluid level detecting means in said filter bed and said at least one fluid level detecting means in said effluent or filtrate compartment with said initialization values to determine headloss and permeability of said filter bed.

16. The method as in claim 15, wherein said step of inputting permeability initialization values is accomplished by an operator who manually inputs said initialization values.

17. The method as in claim 16, wherein each of said fluid level detecting means in said filter bed and in said effluent or filtrate compartment, respectively comprise at least one fluid level detection probe.

18. The method as in claim 17, wherein said fluid level detection probes further comprise ultrasonic fluid level detectors.

* * * * *